(12) United States Patent
Tremblay

(10) Patent No.: US 11,591,974 B2
(45) Date of Patent: Feb. 28, 2023

(54) SYSTEMS AND METHODS FOR ENGINE CALIBRATION

(71) Applicant: PRATT & WHITNEY CANADA CORP., Longueuil (CA)

(72) Inventor: Jason Tremblay, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 359 days.

(21) Appl. No.: 16/838,270

(22) Filed: Apr. 2, 2020

(65) Prior Publication Data

US 2021/0246840 A1    Aug. 12, 2021

Related U.S. Application Data

(60) Provisional application No. 62/970,953, filed on Feb. 6, 2020.

(51) Int. Cl.
| | |
|---|---|
| *F02C 9/48* | (2006.01) |
| *G01M 15/04* | (2006.01) |
| *G01M 15/14* | (2006.01) |
| *F01D 17/06* | (2006.01) |
| *F02C 9/28* | (2006.01) |

(52) U.S. Cl.
CPC ............... *F02C 9/48* (2013.01); *F01D 17/06* (2013.01); *G01M 15/046* (2013.01); *G01M 15/14* (2013.01); *F02C 9/28* (2013.01); *F05D 2260/80* (2013.01); *F05D 2270/02* (2013.01); *F05D 2270/304* (2013.01); *F05D 2270/802* (2013.01)

(58) Field of Classification Search
CPC .. F02C 9/48; F02C 9/28; F01D 17/06; G01M 15/046; G01M 15/14; F05D 2260/80; F05D 2270/02; F05D 2270/304; F05D 2270/802
See application file for complete search history.

(56) References Cited

U.S. PATENT DOCUMENTS

| | | | |
|---|---|---|---|
| 5,206,816 A * | 4/1993 | Hill | G01H 1/006 702/56 |
| 5,933,005 A * | 8/1999 | Pugh | G01D 5/2457 341/15 |
| 9,140,718 B2 | 9/2015 | O'Neil et al. | |
| 9,383,385 B2 | 7/2016 | Day et al. | |
| 2008/0110283 A1* | 5/2008 | Shaver | G01P 3/481 73/862.328 |

(Continued)

*Primary Examiner* — Mickey H France
(74) *Attorney, Agent, or Firm* — Norton Rose Fulbright Canada LLP

(57) ABSTRACT

Methods and systems for calibrating an engine having a rotating shaft are provided. Readings from a plurality of speed sensors provided in one of a plurality of configurations about the shaft are obtained over a plurality of rotations of the shaft, the readings indicative of the passage of position markers and associated with a first precision level. A parameter indicative of relative spacing between the plurality of speed sensors is determined by applying a statistical algorithm to the readings, the parameter being associated with a second precision level higher than the first precision level. The parameter is compared to reference parameters associated with the plurality of configurations to identify an actual speed sensor configuration from amongst the plurality of configurations. The engine is calibrated based on the actual speed sensor configuration.

20 Claims, 5 Drawing Sheets

(56) References Cited

U.S. PATENT DOCUMENTS

| | | | |
|---|---|---|---|
| 2015/0096371 A1* | 4/2015 | O'Neil | G01P 3/481 |
| | | | 73/488 |
| 2015/0198627 A1* | 7/2015 | Day | G01N 29/14 |
| | | | 73/1.37 |
| 2015/0211380 A1* | 7/2015 | Curlier | G01M 15/14 |
| | | | 415/118 |
| 2017/0191374 A1 | 7/2017 | Boettner | |

\* cited by examiner

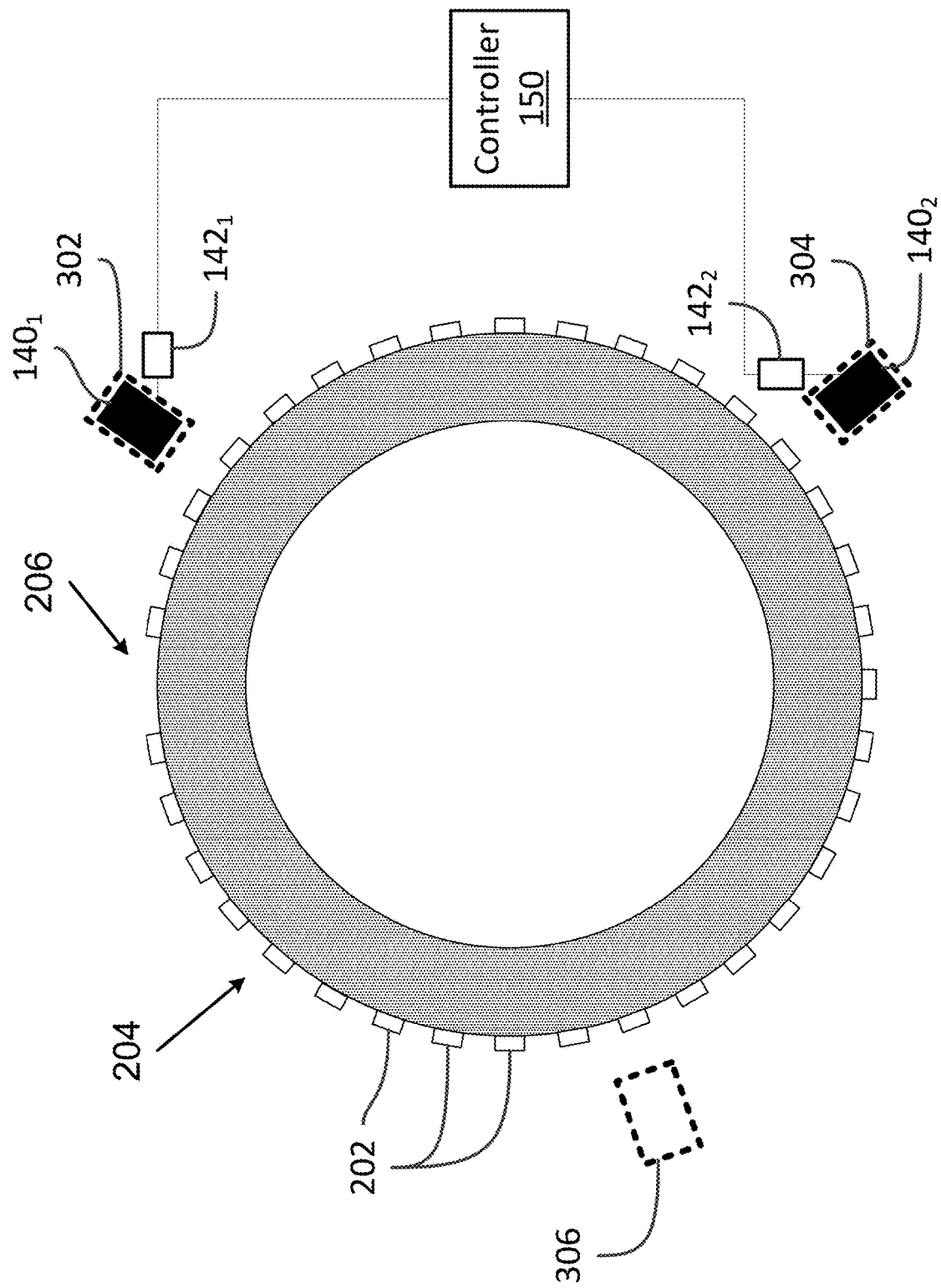

400 

```
┌─────────────────────────────────────────────────────────────┐ 402
│ Obtaining, over a plurality of rotations of a shaft,        │
│ readings from a plurality of speed sensors                  │
└─────────────────────────────────────────────────────────────┘
                            │
                            ▼
┌─────────────────────────────────────────────────────────────┐ 404
│ Determining a parameter indicative of relative spacing      │
│ between the plurality of speed sensors by applying a        │
│ statistical algorithm to the readings                       │
└─────────────────────────────────────────────────────────────┘
                            │
                            ▼
┌─────────────────────────────────────────────────────────────┐ 406
│ Comparing the parameter to reference parameters             │
│ associated with a plurality of configurations to identify   │
│ an actual speed sensor configuration                        │
└─────────────────────────────────────────────────────────────┘
                            │
                            ▼
┌─────────────────────────────────────────────────────────────┐ 408
│ Calibrating an engine based on the actual speed sensor      │
│ configuration                                                │
└─────────────────────────────────────────────────────────────┘
```

FIG. 4

SYSTEMS AND METHODS FOR ENGINE CALIBRATION

TECHNICAL FIELD

The present disclosure relates generally to engines, and more specifically to engine calibration.

BACKGROUND OF THE ART

In a gas turbine engine, inlet air is compressed, mixed with fuel in an inflammable proportion, and exposed to an ignition source to ignite the mixture which then continues to burn to produce combustion products. The combustion of fuel can be leveraged to produce mechanical work, for instance to rotate fans, turbines, propellers, an output shaft, or the like. Electrical motors, as well as other types of engines, can also be used to produce similar mechanical work.

In some engines, it can be desirable to monitor the rotational speed of the mechanical systems subjected to the aforementioned mechanical work. For this purpose, speed sensors of various types are used, which can require calibration.

While existing approaches for calibrating engine speed sensors are suitable for their purposes, improvements may be desirable.

SUMMARY

In accordance with a broad aspect, there is provided a method for calibrating an engine having a rotating shaft. Readings from a plurality of speed sensors provided in one of a plurality of configurations about the shaft are obtained over a plurality of rotations of the shaft, the readings indicative of the passage of position markers and associated with a first precision level. A parameter indicative of relative spacing between the plurality of speed sensors is determined by applying a statistical algorithm to the readings, the parameter being associated with a second precision level higher than the first precision level. The parameter is compared to reference parameters associated with the plurality of configurations to identify an actual speed sensor configuration from amongst the plurality of configurations. The engine is calibrated based on the actual speed sensor configuration.

In accordance with another broad aspect, there is provided a system for calibrating an engine having a rotating shaft. The system comprises a processing unit, and a non-transitory computer-readable medium. Stored on the computer-readable medium are instructions executable by the processing unit for: obtaining, over a plurality of rotations of the shaft, readings from a plurality of speed sensors provided in one of a plurality of configurations about the shaft, the readings indicative of the passage of position markers and associated with a first precision level; determining a parameter indicative of relative spacing between the plurality of speed sensors by applying a statistical algorithm to the readings, the parameter being associated with a second precision level higher than the first precision level; comparing the parameter to reference parameters associated with the plurality of configurations to identify an actual speed sensor configuration from amongst the plurality of configurations; and calibrating the engine based on the actual speed sensor configuration.

Features of the systems, devices, and methods described herein may be used in various combinations, in accordance with the embodiments described herein.

BRIEF DESCRIPTION OF THE DRAWINGS

Reference is now made to the accompanying figures in which:

FIG. 3 is a plan view of a portion of the example speed-sensing system of FIGS. 2A-B;

FIG. 4 is a flowchart illustrating an example method for calibrating an engine.

It will be noted that throughout the appended drawings, like features are identified by like reference numerals.

DETAILED DESCRIPTION

Figure 1:
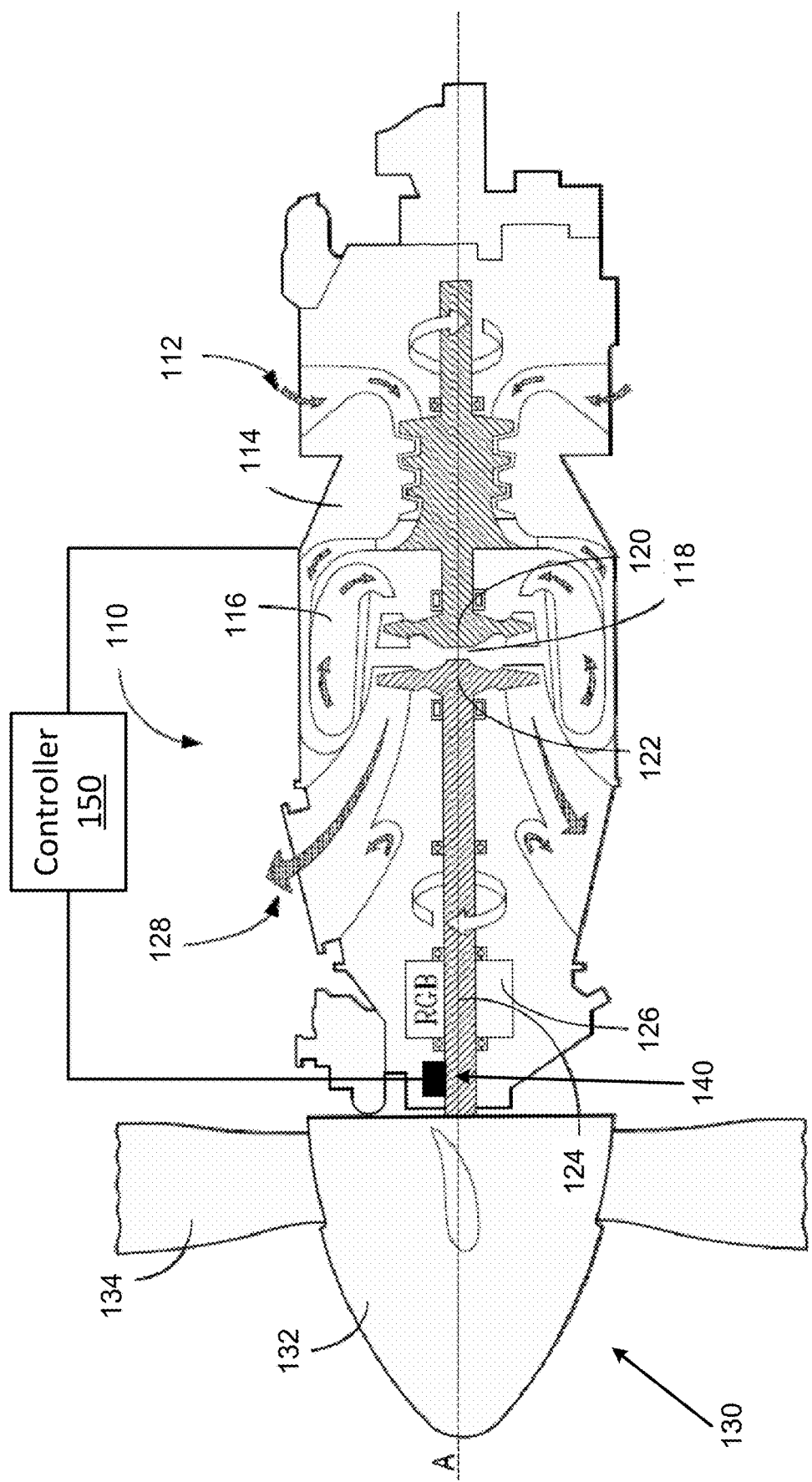
FIG. 1 is a schematic cross-sectional view of an example gas turbine engine.

With reference to FIG. 1, a gas turbine engine 110 is shown. The engine 110 comprises an inlet 112 through which ambient air is propelled, a compressor section 114 for pressurizing the air, a combustor 116 in which the compressed air is mixed with fuel and ignited for generating an annular stream of hot combustion gases, and a turbine section 118 for extracting energy from the combustion gases. In this example, the engine 110 is a turboprop engine of a type typically provided for use in subsonic flight. It should be noted, however, that the techniques described herein are considered to be applicable to other types of gas turbine engines, including turboshaft, turboprop, and turbojet engines, and to other types of combustion engines, including Wankel engines and reciprocating engines.

The turbine section 118 comprises a compressor turbine 120, which drives the compressor assembly and accessories, and at least one power or free turbine 122, which is independent from the compressor turbine 120 and rotatingly drives a rotor shaft (also referred to herein as a propeller shaft or an output shaft) 124 about a propeller shaft axis 'A' through a reduction gearbox (RGB) 126. Rotation of the output shaft 124 is facilitated by one or more bearing assemblies, which can be disposed within the RGB 126 or at any other suitable location. Hot gases may then be evacuated through exhaust stubs 128. The gas generator of the engine 110 comprises the compressor section 114, the combustor 116, and the turbine section 118.

A rotor, in the form of a propeller 130 through which ambient air is propelled, is composed of a plurality of propeller blades 134. The rotor may, for example, comprise the propeller 130 of a fixed-wing aircraft, or a main (or tail) rotor of a rotary-wing aircraft such as a helicopter. The propeller 130 may comprise a plurality of circumferentially-arranged blades connected to a hub by any suitable means and extending radially therefrom. The blades are also each rotatable about their own radial axes through a plurality of blade angles, which can be changed to achieve modes of operation, such as feather, full reverse, and forward thrust.

At least part of the operation of the engine 110 is controlled via a controller 150, which can be electrically and/or mechanically coupled to the engine 110 in any suitable fashion. For example, the controller 150 can be provided as one or more Full Authority Digital Engine Controllers (FADECs) or similar devices. The controller 150 is configured for receiving various instructions from an operator of the engine 110 and/or of an aircraft or other vehicle of which the engine 110 is a component. In addition, the controller 150 can provide to the operator various information about the operation of the engine 110. In some embodiments, the controller 150 controls the operation of the engine 110 via one or more electrical and electronic communication pathways. Alternatively, or in addition, the engine controller 150 controls the operation of the engine 110 via one or more actuators, mechanical linkages, hydraulic systems, and the like.

The engine 110 can also include one or more sensors 140 which collect information on various operating conditions within the engine 110. As discussed in greater detail hereinbelow, the sensors 140 can acquire various readings, including temperature readings, pressure readings, speed and/or angular velocity readings, torque readings, vibration readings, and the like. In at least some embodiments, the sensors 140 include a plurality of speed sensors which serve to monitor the rotational speed of one or more components within the engine 110, including the output shaft 124, or any other shaft of the engine 110.

Figures 2A, 2B:
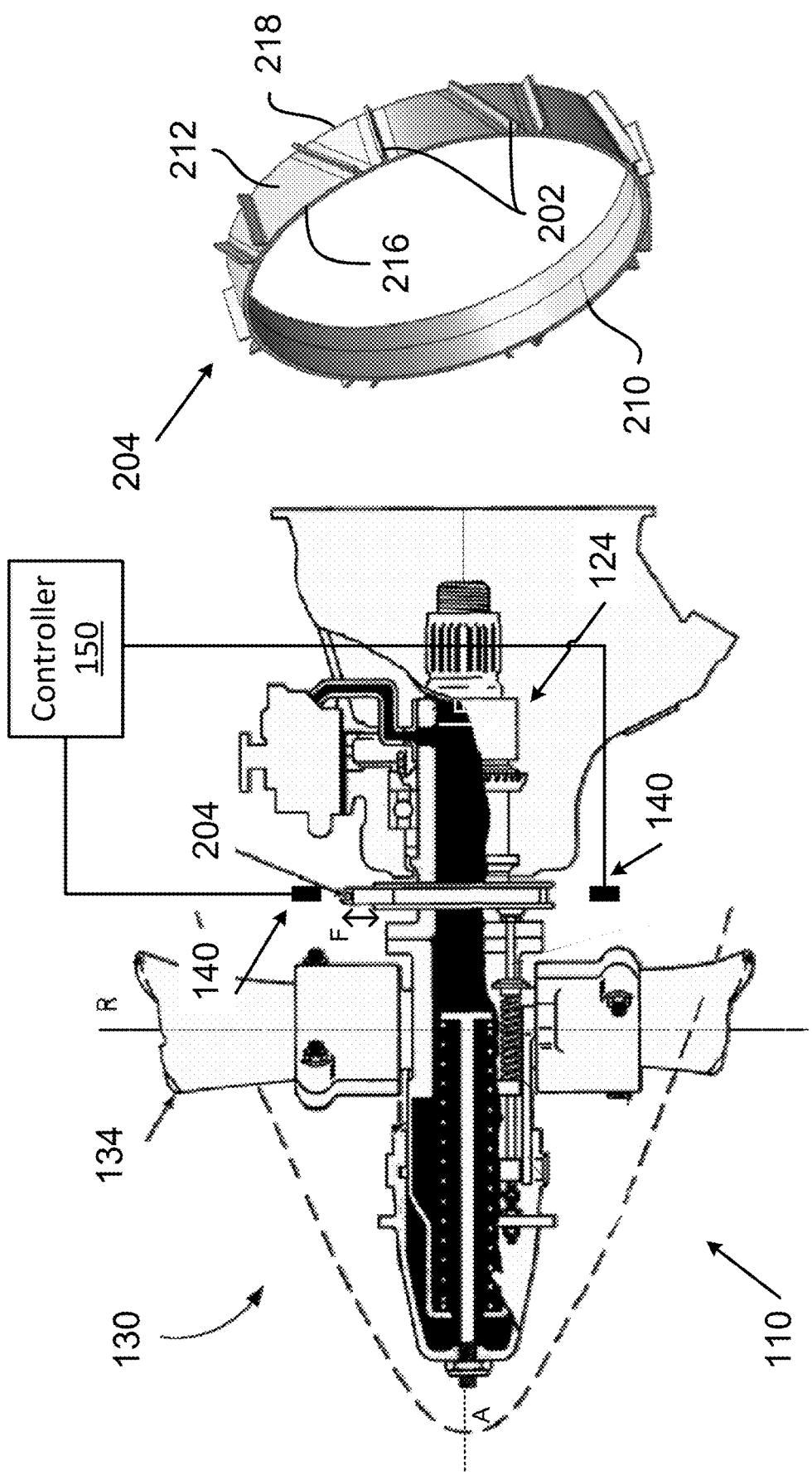
FIGS. 2A-B are schematic diagrams of a portion of the engine of FIG. 1 illustrating an example speed-sensing system.

With reference to FIGS. 2A-B, a speed-sensing system is illustrated at element 200 for use with the engine 110. In the embodiment illustrated in FIGS. 2A-B, the speed-sensing system 200 is composed of a feedback device (also referred to as a feedback ring, beta ring, or phonic wheel) 204 and one or more sensors 140. In some embodiments, the system 200 provides for detection and measurement of rotational speed of one or more rotating elements of the engine 110, for instance the output shaft 124. In some other embodiments, the system 200 can also provide information regarding a propeller blade angle on propeller systems, such as the propeller 130 of FIG. 1. It should be noted that although the present disclosure focuses on the use of the system 200 and the feedback device 204 in gas-turbine engines, similar techniques can be applied to other types of engines, including, but not limited to, electric engines and hybrid electric propulsion systems having a propeller driven in a hybrid architecture (series, parallel, or series/parallel) or turboelectric architecture (turboelectric or partial turboelectric). In addition, the system 200 can be used in other feedback situations, including (but not limited to) turbine auxiliary wheels, speed target disks, speed probes for output shafts, phonic wheels, and the like.

The feedback device 204 is an annular or circular member having disposed on an outer surface and/or on an inner surface thereof a plurality of circumferentially-spaced apart and detectable features (also referred to as position markers or teeth) 202 disposed thereon for detection by sensor(s) 140. The feedback device 204 comprises opposing faces having the edge surfaces 216, 218 and defines an outer surface 212 (sometimes referred to as a "root surface") which extends between the opposing faces and circumscribes them. Put differently, the root surface 212 of the feedback device 204 is the outer periphery of the feedback device 204 which spans between the two opposing edge surfaces 216, 218, and the root surface 212 intersects the faces at the edge surfaces 216, 218. In these embodiments, the position markers 202 can take the form of projections which extend from the root surface 212.

As noted, in some embodiments, the position markers 202 may be disposed on a radially-outer side of feedback device 204, illustrated here as outer surface 212. Alternatively, position markers 202 and sensor(s) 140 could be disposed on a radially-inner side of feedback device 204, illustrated here as inner surface 210. Several position markers 202 may be spaced about the circumference (i.e., the perimeter) of the feedback device 204. The position markers 202 can be spaced equiangularly, at varying intervals, or the like. In addition, the feedback device 204 can include any suitable number of position markers 202, which can vary based on the dimensions of the feedback device 204. Other embodiments may apply.

The position markers 202 consist of a plurality of projections arranged along a direction substantially transverse to the edge surfaces 216, 218. In some embodiments, the position markers 202 are substantially equally spaced from one another on the root surface 212; alternatively, the spacing between the position markers 202 can vary. In some embodiments, the position markers 202 are integrally formed with the feedback device 204 so that the feedback device 204 may have a unitary construction. In some other embodiments, the position markers 202 are manufactured separately from the feedback device 204 and attached thereto using any suitable technique, such as welding or the like. In some embodiments, some of the position markers 202 have different circumferential thicknesses and/or chamfered edges. In some other embodiments, the longitudinal length of the position markers 202 varies from one to the next. Other embodiments are also considered. For example, in some embodiments, some of the position markers 202 are angled with respect to the edge surfaces 216, 218.

In some embodiments, the one or more sensors 140 are fixedly mounted to a static portion of the engine 110, and the position markers 202 rotate with the output shaft 124 and/or the propeller 130. In other embodiments, the one or more sensors 140 are mounted for rotation with the propeller 130 and/or the output shaft 124, and the feedback device 204 is fixedly mounted to a static portion of the engine 110. In some further embodiments, the position markers 202 and/or the feedback device 204 can be integrally formed with the output shaft 124 and/or with part of the propeller 130. Other embodiments are also considered.

As discussed hereinabove, the controller 150 is communicatively coupled to the one or more sensors 140. The sensor(s) 140 are configured for producing one or more sensor signals which are transmitted to or otherwise received by the controller 150. The sensor signals can be electrical signals, digital or analog, or any other suitable type of signal. In some embodiments, the sensor(s) 140 produce a signal pulse in response to detecting the presence of a position marker 202 in a sensing zone of the sensor 140.

For example, the sensor 140 is an inductive sensor that operates on detecting changes in magnetic flux, and has a sensing zone which encompasses a circular or rectangular area or volume in front of the sensor 140. When a position marker 202 is present in the sensing zone, or passes through the zone during rotation of the feedback device 204, the magnetic flux generated by the sensor(s) 140 in the sensing zone is varied by the presence of the position marker 202, and the sensor 140 can produce a signal pulse, which forms part of the sensor signal. Accordingly, the position markers 202 may be made of any suitable material (e.g., a ferromagnetic material, Mu-Metal, or the like) which would cause the passage of the position markers 202 near the sensor 140 to provide a change in magnetic permeability within the magnetic field generated by the sensor 140.

The signal pulses produced by the sensors 140, which form part of the electrical signal received by the control unit 220, can be used to determine various operating parameters of the engine 110 and the propeller 130. The position markers 202 can be used to determine a longitudinal position of the feedback device 204, and thereby assess the pitch angle for the propeller 130. In addition, detection of the position markers 202 can be used to determine a rotational speed of the feedback device 204, and thereby assess a rotational speed for the propeller 130.

It should also be noted that, although the present disclosure discusses embodiments in which the position markers 202 are projections, other embodiments are also considered. The position markers 202 may, for example, comprise one or more of protrusions, teeth, walls, voids, recesses, and/or other singularities. For instance, in some embodiments, the position markers 202 may be embedded in the ring element 310 portion of the feedback device 204, such that the feedback device 204 has a substantially smooth or uniform root surface 212. A position marker 202 can then be a portion of the feedback device 204 which is made of a different material, or to which is applied a layer of a different material. The position markers 202 may then be applied to the root surface 212, for instance as strips of metal or other material for detection by the sensor 140, which can be an inductive sensor capable of sensing changes in magnetic flux (as discussed above) or any other suitable sensor such as a Hall sensor or a variable reluctance sensor. Still other embodiments are considered.

With continued reference to FIGS. 2A-B, assessment of the rotational speed of the feedback device 204, which rotates along one of the directions indicated by the arrow 'F', can be performed in various fashions. In some embodiments, a known number of the position markers 202 are of a different geometry than the remainder of the position markers 202, as illustrated in FIG. 3. The sensor 140 can detect the position markers 202 with different geometry, and based thereon can determine the rotational speed of the feedback device 204. In some other embodiments, a gap or other discontinuity is formed in the position markers 202 of the feedback device 204, for instance in the form of one or more "missing teeth". When a missing tooth passes by the sensor 140, no change in the sensor signal is produced. In this fashion, a longer-than-expected period in which no change in the sensor signal is detected can indicate the passage of the missing tooth. Repeated detections of the missing tooth can be used to assess the rotational speed of the feedback device 204. Other approaches are also considered.

With reference to FIG. 3, a plan view of an embodiment of the feedback device 204 is illustrated, including the position markers 202 and the missing tooth illustrated at 206. Two of the sensors 140 are also illustrated as sensors $140_1$ and $140_2$. Depending on the particular configuration of the engine 110, the sensors 140 can be provided in one of a plurality of circumferential positions about the engine, illustrated here as positions 302, 304, and 306. Although the embodiment of FIG. 3 indicates three (3) possible positions for the sensors 140, it should be noted that in other embodiments, any suitable number of possible positions for the sensors 140 are considered, and any suitable number of sensors 140 can be employed.

Depending on the number of possible positions 302-306 for the sensors 140, a number of different configurations of the sensors 140 are possible. In order to further illustrate the example of FIG. 3, Table 1 below provides a listing of the different possible configurations of the sensors 140, illustrated here as a first sensor $140_1$ and a second sensor $140_2$: In this example, the feedback device 204 can be provided with 35 position markers 202 and the missing tooth 206, such that there is a spacing of 10° between each of the position markers 202 from midpoint-to-midpoint (except for the two position markers which flank the missing tooth 206, which are separated by 20° midpoint-to-midpoint).

TABLE 1

Possible Configurations of Sensors $140_1$ and $140_2$

| Configuration No | Location (degrees) | | Sensor Spacing (degrees) |
|---|---|---|---|
| | Sensor $140_1$ | Sensor $140_2$ | |
| 1 | 35 | 141 | 106 |
| 2 | 35 | 250 | 215 |
| 3 | 141 | 35 | 254 |
| 4 | 141 | 250 | 109 |
| 5 | 250 | 35 | 145 |
| 6 | 250 | 141 | 251 |

Knowledge of the actual configuration of the sensors $140_1$, $140_2$ (hereinafter referred to as the "actual sensor configuration") can be provided to the controller 150 and/or to an operator of the engine 110. In some embodiments, the actual sensor configuration is used to calibrate the operation of the engine 110, of the controller 150, and/or of other components of the engine 110. For example, the actual sensor configuration can be used to calibrate the information produced by the sensors 140. In another example, the actual sensor configuration can be used to calibrate other information obtained by the controller 150, for instance vibration data produced by other ones of the sensors 140. In some such embodiments, the sensors 140 include one or more vibration sensors, the position of which relative to the sensors $140_1$, $140_2$ and/or to the different-geometry position markers 202 can be known. By additionally determining the actual sensor configuration of the sensors $140_1$, $140_2$, the phase of vibration data collected by the one or more vibration sensors can also be determined.

For example, vibration data can be collected by one of the sensors 140 disposed adjacent to the feedback device 204. The vibration data can be collected relative to the speed data collected by the sensors 140. The orientation of the vibration data (i.e., the directionality of the vibration) will also be obtained relative to the position of the sensors 140, and the actual sensor configuration can be used to properly orient the vibration data. Once the vibration data is oriented, it can be used, for example, in conjunction with fan balancing techniques. Still other use cases for the actual sensor configuration are considered.

In some embodiments, when the engine 110 is first provided by a manufacturer, the actual sensor configuration is known, and the controller 150 is configured with an indication of the actual sensor configuration. However, the actual sensor configuration can change over the operational life of the engine 110. For example, one of the sensors $140_1$, $140_2$ can become inoperative due to a mechanical or electrical breakdown, and a replacement sensor can be installed in a different location. Other maintenance actions can also result in a change in the actual sensor configuration. In some cases, the controller 150 may be provided with the functionality to itself perform an assessment of the actual sensor configuration. For instance, by providing the controller 150 with the ability to self-assess the actual sensor configuration, the controller 150 can provide a greater level of reliability, and can confirm that information provided to the controller 150, for instance by a maintenance crew, is correct.

With continued reference to FIG. 3, the controller 150 can monitor the data produced by the sensors 140 to measure an angular distance between the sensors $140_1$, $140_2$. In some embodiments, the controller 150 monitors the sensors 140 to determine when each of the sensors 140 detects the missing tooth 206. The controller additionally determines how many of the position markers 202 are detected by the sensor $140_1$ in the time between the missing tooth 206 passing from the sensor $140_1$ to the sensor $140_2$. The count of the position markers 202 detected in this time period is used to estimate the angular distance between the sensors 140, which in turn is compared to the different configurations known to the controller 150, for instance as listed in Table 1. This approach for determining the angular distance between the sensors 140 is associated with a first precision level, based on the spacing between the position markers 202. Put differently, the estimation of the angular distance between the sensors 140 accurately represents the actual sensor configuration to within plus-or-minus the angular separation between two position markers 202, which in the example of FIG. 3 is 10°.

However, in some cases, the angular spacing between the sensors $140_1$, $140_2$ in certain configurations are similar. For instance, configurations 1 and 4 of Table 1 differ only by 3°. Similarly, configurations 3 and 6 differ only by 3°. As a result, estimating the angular distance between the sensors $140_1$, $140_2$ as described above may not be sufficiently precise to tell the difference between different ones of the possible configurations for the sensors 140. In particular, sets of possible configurations where the angular spacing between the sensors 140 is less than the spacing between two adjacent ones of the position markers 202 may be difficult to determine. As a result, an approach which provides a level of accuracy greater than the spacing between the position markers 202 is desirable to properly differentiate between certain sets of possible sensor configurations.

The sensors 140 are provided with associated memory buffers, illustrated here as buffers $142_1$, $142_2$ (collectively "the buffers 142"). The buffers 142 can be part of the sensors 140, can be separate but coupled thereto, or can be part of the controller 150, as appropriate. In some embodiments, the buffers are of a fixed size, for instance based on the number of position markers 202 for the feedback device 204. The buffers 142 store a count of the number of position markers 202 detected by the sensors 140 since the missing tooth 206 was last detected. In these embodiments, the position of the missing tooth 206 acts as a reference position for the sensors 140.

In some embodiments, the controller 150 can access the buffers 142 at any suitable time and compare the count of the number of position markers 202 detected by each of the sensors 140 following the passage of the missing tooth 206. The controller 150 can read the buffers 142 periodically at any suitable frequency. For example, the controller 150 can be provided with a predetermined time step value—any suitable value of a number of microseconds or a number of milliseconds—and reads the buffers 142 periodically every time step. Depending on the timing of the readings of the buffers 142 by the controller 150, different readings for the count of position markers 202 will be provided by the buffers 142.

Depending on the particular phase of the feedback device 204, the count of the number of position markers 202 in the buffers 142 will vary from one reading to the next. The controller 150 compares the readings obtained from the buffers 142 to determine a number of position markers 202 between the sensors 140. Due to the variance in the number of position markers 202 from one reading to the next, the controller 150 can obtain multiple readings over a predetermined period of operation of the engine 110, for instance several processor periods for a processing unit of the controller 150. For example, the controller 150 collects data over several dozen, several hundred, or several thousand processor periods, which can correspond to several microseconds, several milliseconds, several seconds, several minutes, or any other suitable period of operation, for instance during a flight mission of an aircraft of which the engine 110 is a component.

The controller 150 then determines a parameter indicative of the relative spacing between the sensors 140, for instance an angular spacing between the sensors 140 for each processor period sampled by the controller 150. A sample set is generated from multiple continuous readings over the predetermined time period, which will define a periodic spacing pattern observable within the sample set. The controller 150 can then apply a statistical algorithm to the data obtained during the period of operation to determine the angular spacing. In some embodiments, the statistical algorithm is an average: the controller 150 compares the readings obtained from the buffers 142 to determine the number of position markers 202 between the sensors 140 for each time step, and averages the results over the period of operation. In other embodiments, other statistical algorithms can be applied: for instance, the controller 150 can be configured to reject certain outlier values, to perform error correction, or the like. In some embodiments, the controller 150 applies the statistical algorithm substantially in real time to the data as it is collected. In other embodiments, the controller 150 applies the statistical algorithm once the period of operation is completed. Other approaches are also considered.

Because the controller 150 reads the buffers 142 periodically, the phase of the feedback device 204 will cause the difference in the number of position markers 202 between the sensors 140 to vary from one reading to the next. By taking a larger sample of readings and applying an averaging or other relevant statistical algorithm to produce the parameter, the variations will be smoothed proportionally to the actual angular distance between the sensors 140. As a result, the parameter can have a level of precision higher than the spacing between the position markers 202, despite the sensors 140 having a precision level equivalent to the spacing between the position markers 202.

In some embodiments, the parameter can be a number of position markers 202, represented to any suitable number of decimal points. For example, a number of position markers separating the sensors $140_1$, $140_2$ can be determined, and the values can be compared to one or more known patterns. In some other embodiments, the parameter can be an angular value, which can be expressed in degrees, radians, or the like. In some further embodiments, the parameter can be an angular distance, which can be expressed as an arc length in any suitable units. Other approaches are also considered.

Once the controller 150 determines the parameter which indicates the relative spacing between the sensors 140, the controller 150 can compare the parameter to the reference parameters presented in Table 1. Each configuration of the sensors $140_1$, $140_2$ will define a unique pattern, for a given rotational speed, which can be used to identify the actual sensor configuration. For instance, if the parameter as determined by the controller 150 is an average position marker count of 10.55 position markers, the controller 150 determines that the angular spacing between the sensors 140 is 105.5°, based on a spacing of 10° per position marker 202. Referring again to Table 1, the controller 150 can compare the parameter value of 105.5° to the reference values for the sensor spacing (rightmost column), and identify the actual sensor configuration (in this example, the actual sensor configuration is Configuration No. 1). Using this approach, Configuration No. 1 can be differentiated from Configuration No. 4, and the precision level of the readings provided by the sensors 140 can be increased.

It should be noted that in some embodiments, the controller 150 compares the parameter to the reference values for the possible configurations and identifies a match within a predetermined tolerance, for instance a predetermined percent deviation, or a predetermined absolute value deviation. In the example of Table 1, since two pairs of configurations are within 3° of each other, a tolerance of 1° can be set. Other approaches are also considered.

Once the controller identifies the actual sensor configuration, the controller 150 can calibrate the engine 110 based on the actual sensor configuration. In some embodiments, the controller 150 updates a configuration file or other stored record with the actual sensor configuration. In some other embodiments, the controller 150 calibrates the engine 110 to update one or more modes of operation based on the actual sensor configuration. In some further embodiments, the controller 150 calibrates the engine 110 to characterize other data provided to the controller 150, for instance vibration data, relative to the actual sensor configuration. Other types of calibration are also considered.

With reference to FIG. 4, there is illustrated a method 400 for calibrating an engine having a rotating shaft, for instance the engine 110, which has the output shaft 124. At step 402, readings from a plurality of speed sensors are obtained over a plurality of rotations of the output shaft 124, for instance from the sensors 140. The readings are indicative of the passage of position markers, for instance the position markers 202 of the feedback device 204, which rotates with the output shaft 124. The readings obtained from the sensors 140 are associated with a first precision level, for instance based on the angular spacing between the position markers 202.

At step 404, a parameter indicative of the relative spacing between the plurality of sensors 140 is determined by applying a statistical algorithm to the readings. The parameter can be an average number of position markers 202 between the sensors 140, an angular spacing or angular distance between the sensors 140, or any other suitable parameter. Due to the application of the statistical algorithm to the readings, the precision level for the parameter is higher than the precision level for the readings themselves.

At step 406, the parameter is compared to reference parameters associated with the plurality of configurations to identify an actual speed sensor configuration for the sensors 140, for instance the aforementioned actual sensor configuration. In some embodiments, the parameter is compared to the reference parameters to identify a match within a predetermined tolerance.

At step 408, an engine, for instance the engine 110, is calibrated based on the actual sensor configuration. The calibration of the engine 110 can include updating a configuration file associated with the engine 110, updating a mode of operation of the engine 110, characterizing data collected by a controller of the engine 110, for instance orienting vibration data obtained by the controller 150, or the like.

Figure 5:
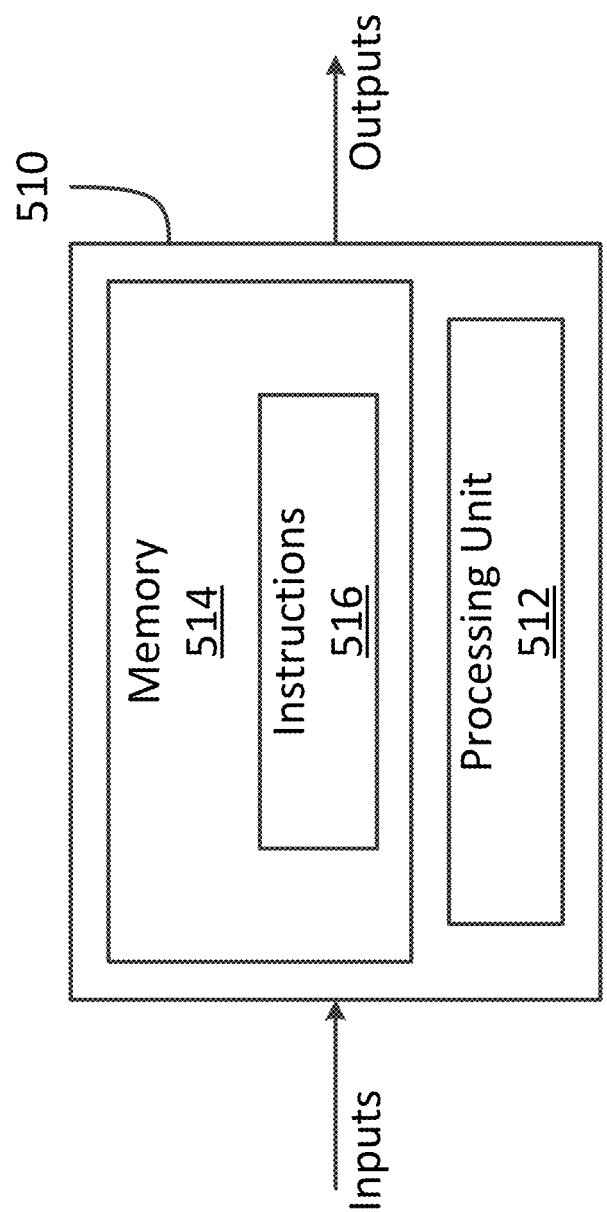
FIG. 5 is a block diagram of an example computing system for implementing the method of FIG. 4.

With reference to FIG. 5 the method 400 may be implemented using a computing device 510 comprising a processing unit 512 and a memory 514 which has stored therein computer-executable instructions 516. The processing unit 512 may comprise any suitable devices configured to implement the system such that instructions 516, when executed by the computing device 510 or other programmable apparatus, may cause the functions/acts/steps of the method 400 as described herein to be executed. The processing unit 512 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 514 may comprise any suitable known or other machine-readable storage medium. The memory 514 may comprise non-transitory computer readable storage medium, for example, but not limited to, an electronic, magnetic, optical, electromagnetic, infrared, or semiconductor system, apparatus, or device, or any suitable combination of the foregoing. The memory 514 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 514 may comprise any storage means (e.g., devices) suitable for retrievably storing machine-readable instructions 516 executable by processing unit 512. In some embodiments, the computing device 510 can be implemented as part of a full-authority digital engine controls (FADEC) or other similar device, including electronic engine control (EEC), engine control unit (ECU), and the like.

The methods and systems described herein may be implemented in a high level procedural or object oriented programming or scripting language, or a combination thereof, to communicate with or assist in the operation of a computer system, for example the computing device 510. Alternatively, the methods and systems may be implemented in assembly or machine language. The language may be a compiled or interpreted language. Program code for implementing the methods and systems for detection may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or in some embodiments the processing unit 512 of the computing device 510, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method for calibrating an engine having a rotating shaft, the method comprising:
    obtaining, over a plurality of rotations of the shaft, readings from a plurality of speed sensors provided in one of a plurality of configurations about the shaft, the readings indicative of the passage of position markers and associated with a first precision level;
    determining a parameter indicative of relative spacing between the plurality of speed sensors by applying a statistical algorithm to the readings, the parameter being associated with a second precision level higher than the first precision level;
    comparing the parameter to reference parameters associated with the plurality of configurations to identify an actual speed sensor configuration from amongst the plurality of configurations; and
    calibrating the engine based on the actual speed sensor configuration.

2. The method of claim 1, wherein the readings comprise a count of the position markers between the plurality of speed sensors, relative to a reference position on a feedback device.

3. The method of claim 2, wherein the reference position is identified by a gap between the position markers.

4. The method of claim 1, wherein comparing the parameter to the reference parameters to identify an actual speed sensor configuration comprises identifying a match between the parameter and one of the reference parameters within a predetermined tolerance associated with the second precision level.

5. The method of claim 1, wherein calibrating the engine comprises orienting vibration data obtained for the engine based on the actual speed sensor configuration.

6. The method of claim 1, wherein calibrating the engine comprises updating a configuration associated with the engine to indicate the actual speed sensor configuration.

7. The method of claim 1, wherein the statistical algorithm comprises an average over the sum of the plurality of rotations.

8. The method of claim 7, wherein the parameter comprises an average count of the position markers present between the plurality of speed sensors.

9. The method of claim 1, wherein at least some of the plurality of configurations for the plurality of speed sensors are associated with reference values of less than a mean distance between the position markers of a feedback device.

10. The method of claim 1, wherein the readings are stored in memory buffers associated with the plurality of speed sensors, the memory buffers having a finite number of memory addresses.

11. A system for calibrating an engine having a rotating shaft, the system comprising:
    a processing unit; and
    a non-transitory computer-readable medium having stored thereon instructions executable by the processing unit for:
        obtaining, over a plurality of rotations of the shaft, readings from a plurality of speed sensors provided in one of a plurality of configurations about the shaft, the readings indicative of the passage of position markers and associated with a first precision level;
        determining a parameter indicative of relative spacing between the plurality of speed sensors by applying a statistical algorithm to the readings, the parameter being associated with a second precision level higher than the first precision level;
        comparing the parameter to reference parameters associated with the plurality of configurations to identify an actual speed sensor configuration from amongst the plurality of configurations; and
        calibrating the engine based on the actual speed sensor configuration.

12. The system of claim 11, wherein the readings comprise a count of the position markers between the plurality of speed sensors, relative to a reference position on a feedback device.

13. The system of claim 12, wherein the reference position is identified by a gap between the position markers.

14. The system of claim 11, wherein comparing the parameter to the reference parameters to identify an actual speed sensor configuration comprises identifying a match between the parameter and one of the reference parameters within a predetermined tolerance associated with the second precision level.

15. The system of claim 11, wherein calibrating the engine comprises orienting vibration data obtained for the engine based on the actual speed sensor configuration.

16. The system of claim 11, wherein calibrating the engine comprises updating a configuration associated with the engine to indicate the actual speed sensor configuration.

17. The system of claim 11, wherein the statistical algorithm comprises an average over the sum of the plurality of rotations.

18. The system of claim 17, wherein the parameter comprises an average count of the position markers present between the plurality of speed sensors.

19. The system of claim 11, wherein at least some of the plurality of configurations for the plurality of speed sensors are associated with reference values of less than a mean distance between the position markers of a feedback device.

20. The system of claim 11, wherein the readings are stored in memory buffers associated with the plurality of speed sensors, the memory buffers having a finite number of memory addresses.

* * * * *